Patented Dec. 14, 1948

2,455,924

UNITED STATES PATENT OFFICE 2,455,924

ADDITION COMPOUNDS OF PYRIDINE DERIVATIVES AND METHOD OF PREPARING SAME

Ernst A. H. Friedheim and Saul Soloway, New York, N. Y.

No Drawing. Application March 1, 1944, Serial No. 524,624

5 Claims. (Cl. 260—270)

1

This invention relates to new addition products of pyridine derivatives and ferric salts, and has particular relation to addition compounds of liquid nicotinic acid alkyl-amides, a ferric halide, and a hydrogen halide. It also relates to the method of preparing such addition products.

The main object of our invention is to provide soluble, solid addition products of the above mentioned type, which can be easily obtained by reacting a suitable pyridine derivative and a ferric halide in the manner described hereinafter.

Another object of the invention is to provide addition products, in which the therapeutic properties of the organic component are enhanced by combination with the ferric component.

It is also an object of the invention to provide a process for preparing the addition products in a simple and convenient manner.

Further objects and the advantages of our invention will be apparent to those skilled in the art from the following specification, which illustrates by way of example some preferred embodiments of the invention, and the appended claims.

In carrying out our present invention, the liquid nicotinic acid alkyl-amide is reacted in acid solution with a ferric halide.

As examples of suitable derivatives of nicotinic acid amide, the diethyl-amide, methyl-ethyl-amide, dipropyl-amide, and diallyl amide of nicotinic acid may be mentioned. Other compounds corresponding to the formula

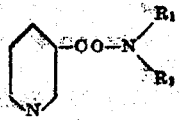

in which $R_1$ and $R_2$ may be the same or different and represent hydrogen or an alkyl group having less than 6 carbon atoms, may also be used. Examples of such compounds are the methyl-propyl-amide, isoamyl-amide, diamyl-amide, ethyl-propyl-amide, allyl-amide and methyl-allyl-amide of nicotinic acid.

According to the preferred embodiment of our invention, the liquid nicotinic acid alkyl-amide is reacted with ferric chloride. However, other ferric halides, such as ferric bromide, may also be used. The fluorides are toxic and the iodides are often ill tolerated, and, therefore, in therapeutic compositions the chlorine or bromine compounds should be used.

In order to form the addition compounds according to our invention, the nicotinic acid alkyl-

2 amide is reacted with the ferric halide in acid solution, the acid present in the solution being the same as that of the ferric halide. For example, nicotinic acid diethylamide or an aqueous solution thereof may be mixed with a concentrated aqueous solution of the ferric halide and with a concentrated aqueous solution of the acid contained in the ferric halide, or the nicotinic acid compound may be dissolved in the aqueous acid, and the solution obtained mixed with the ferric halide solution.

The nicotinic acid compound and the ferric halide may be reacted in equimolecular proportions, or a moderate excess of one of the components preferably an excess of the ferric halide may be used. The acid should be used preferably in a quantity substantially in excess of the equimolecular amount.

The addition compound formed separates in solid form from the reaction mixture either immediately or after some standing. Inoculation of the batch with some of the material obtained in a previous batch, accelerates separation of the addition compound. The solid product thus obtained may be filtered and dried, and the excess acid contained therein removed in any suitable way.

The product thus obtained represents an addition compound consisting of euimolecular amounts of the nicotinic acid alkyl-amide, ferric halide and hydrogen halide, corresponding, for example, to the formula

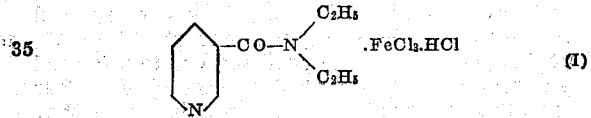

It can be purified by recrystallization from suitable organic solvents, such as chloroform or a mixture of chloroform and amyl acetate. The new compounds may be used for therapeutic purposes, particularly as stimulants, and also for the purification of the liquid nicotinic acid amides by their separation in the form of crystalline products.

The addition products formed in accordance with our invention show an acid reaction in aqueous solution. They may be mixed in the dry state with a dry buffer agent in order to form compositions which yield aqueous solutions of a desired pH, for example solutions suitable for injections. In preparing such buffered mixtures, we prefer the use of an organic buffer substance in mixture with one or more inorganic buffer agents. It has been found that, for example, alkali metal salts of hydrocarboxylic acids, such as lactates, malates, citrates and tartrates of sodium or potassium may be used with advantage as organic buffer agents in mixture with suitable inorganic buffer substances, such as alkali carbonates or bicarbonates, alkali pyrophosphates, and secondary or tertiary alkali phosphates, particularly the sodium and potassium carbonates, bicarbonates and phosphates. Aqueous solutions of buffered mixtures of our new addition compounds have a pH of 7.0–8.0, for example. By suitably adjusting the proportions of the ingredients in buffered mixtures pH values of 2.0 to 8.5 may be obtained.

*Example I.*—100 grams of nicotinic acid diethyl amide are dissolved in 500 cc. of concentrated hydrochloric acid (sp. gr. 1.19) and, while vigorously stirring, a solution of 130 gms. of anhydrous ferric chloride in 150 ccs. of water is slowly added. The reaction temperature is kept slightly below 20° C. After stirring the reaction mixture until crystals are formed, the latter are filtered off, washed on the filter with cold, aqueous concentrated hydrochloric acid, and then dried in vacuo over sodium hydroxide. The formation of crystals can be accelerated by inoculation with material from a previous batch. 213 grams of a yellow compound are obtained. This compound contains 7.44% of nitrogen, 37.4% of chlorine, and 14.9% of iron, thus corresponding to an addition compound of the above Formula I. It may be purified by recrystallization from chloroform, or a mixture of chloroform and amyl acetate. It has a melting point of 133°–135° C. in purified form, is not hygroscopic, and may be heated for several days to its melting point without substantial decomposition. It exhibits highly desirable therapeutic properties corresponding to those of the liquid nicotinic acid diethyl amide, combined with the properties of the ferric ion.

For making a solid preparation yielding an injectable aqueous solution, 30 grams of the product are mixed in a porcelain ball mill, for example, with 120 grams of sodium citrate, and 30 grams of trisodium phosphate (dodecahydrate) until the mixture is entirely homogeneous. Upon dissolution in distilled water, the mixture shows a hydrogen ion concentration of pH 7.

*Example II.*—10 grams of ferric oxide are dissolved in 130 ccs. of a 40% aqueous hydrobromic acid solution. 20 grams of nicotinic acid diethylamide are slowly added to the resulting solution of ferric bromide while vigorously stirring, and keeping the reaction temperature at 15°–20° C., preferably 16° C. The dark red crystals formed are worked up as described in Example I. After repeated recrystallization from chloroform they have a melting point of 119° C., and correspond to the formula

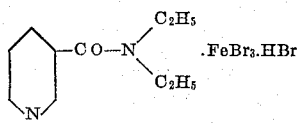

A composition yielding injectable aqueous solutions may be prepared by mixing 30 grams of this compound with 45 grams of sodium malate and 25 grams of tertiary sodium phosphate in the manner described in Example I.

*Example III.*—16.4 grams of N,N-methyl-ethyl nicotinic acid amide are dissolved in 75 ccs. of concentrated hydrochloric acid (sp. gr. 1.19), and added to a solution of 20 grams of ferric chloride in 50 ccs. of water. The yellow precipitate is filtered, washed with concentrated aqueous hydrochloric acid, dried, and then recrystallized from chloroform. It consists of an addition product of the amide, ferric chloride and hydrochloric acid in equimolecular proportions.

Instead of the substituted nicotinic acid amides used in the above Examples I–III, equivalent amounts of dipropyl-amide, methyl-propyl-amide, ethyl-propyl-amide, allyl-amide, diallyl-amide, methyl-allyl-amide, diamyl-amide, and isoamyl-amide of nicotinic acid, may be reacted with a ferric halide and the corresponding hydrogen halide in the manner described in the above examples in order to obtain the corresponding double compounds according to our invention.

It is to be understood that in our present specification and the appended claims the term "liquid" amides denotes amides which are liquid at ordinary room temperature, for example 15°–25° C.

We claim:

1. An addition product of one molecule of a ferric halide selected from the group, consisting of ferric chloride and ferric bromide, one molecule of the hydrogen halide of the halogen of said ferric halide and one molecule of nicotinic acid diethylamide.

2. An addition product of one molecule of ferric chloride, one molecule of hydrochloric acid, and one molecule of nicotinic acid diethylamide.

3. An addition product of one molecule of ferric bromide, one molecule of hydrogen bromide, and one molecule of nicotinic acid diethylamide.

4. A process for preparing an addition product as claimed in claim 1, said process comprising reacting a ferric halide selected from the group consisting of ferric chloride and ferric bromide, with nicotinic acid diethylamide, in aqueous solution in the presence of the hydrogen halide of the halogen of said ferric halide.

5. A process for preparing an addition product of the type claimed in claim 2, said process comprising reacting ferric chloride and nicotinic acid diethylamide in concentrated aqueous hydrochloric acid solution at a temperature of 15°–20° C.

ERNST A. H. FRIEDHEIM.
SAUL SOLOWAY.

REFERENCES CITED

The following references are of record in the file of this patent:

UNITED STATES PATENTS

| Number | Name | Date |
|---|---|---|
| 2,256,604 | Anhagen | Sept. 23, 1941 |
| 2,317,309 | Stenzl | Apr. 20, 1943 |
| 2,364,018 | Banard | Nov. 28, 1944 |

OTHER REFERENCES

Chem. Abstracts (Gantier) (1943), page 3757.
Sollman: "A Manual of Pharmacology," page 1077, (1942), pub. by W. B. Saunders and Co., Phila., Pa.
Ser. No. 414,927, Rosichy (A. P. C.), published April 20, 1943.